(12) United States Patent
Lecomte

(10) Patent No.: US 7,327,936 B2
(45) Date of Patent: Feb. 5, 2008

(54) SECURED DEVICE FOR THE PROCESSING OF HIGH-QUALITY AUDIOVISUAL WORKS

(75) Inventor: Daniel Lecomte, Paris (FR)

(73) Assignee: Medialive (FR)

( * ) Notice: Subject to any disclaimer, the term of this patent is extended or adjusted under 35 U.S.C. 154(b) by 640 days.

(21) Appl. No.: 10/503,110

(22) PCT Filed: Jan. 15, 2003

(86) PCT No.: PCT/FR03/00123

§ 371 (c)(1),
(2), (4) Date: Nov. 2, 2004

(87) PCT Pub. No.: WO03/065725

PCT Pub. Date: Aug. 7, 2003

(65) Prior Publication Data

US 2005/0111558 A1    May 26, 2005

(30) Foreign Application Priority Data

Jan. 30, 2002  (FR)  .................................. 02 01100

(51) Int. Cl.
*H04N 11/02* (2006.01)

(52) U.S. Cl. ................... 386/94; 709/236; 375/240.26; 375/240.29

(58) Field of Classification Search .................... 380/3, 380/7, 10, 11, 15, 20, 21, 43, 262; 360/13, 360/15; 709/236; 386/46, 52, 83, 92, 94, 386/95; 375/240.26, 240.29, 240.11
See application file for complete search history.

(56) References Cited

U.S. PATENT DOCUMENTS

| | | | |
|---|---|---|---|
| 5,892,825 A | | 4/1999 | Mages et al. |
| 5,937,164 A | | 8/1999 | Mages et al. |
| 6,035,329 A | | 3/2000 | Mages et al. |
| 6,104,860 A | * | 8/2000 | Lee et al. ..................... 386/94 |
| 6,233,356 B1 | * | 5/2001 | Haskell et al. .............. 382/243 |
| 6,591,293 B1 | * | 7/2003 | Poetzschke et al. ......... 709/206 |
| 2001/0028725 A1 | * | 10/2001 | Nakagawa et al. ......... 382/100 |
| 2001/0053222 A1 | * | 12/2001 | Wakao et al. ................. 380/43 |

FOREIGN PATENT DOCUMENTS

EP        0 778 513        6/1997

(Continued)

*Primary Examiner*—Thai Q. Tran
*Assistant Examiner*—Mishawn Dunn
(74) *Attorney, Agent, or Firm*—DLA Piper US LLP

(57) ABSTRACT

A method for distributing video sequences according to a nominal flow format including a succession of frames, each including at least one I block corresponding to a complete digital I image, each I image being broken down into blocks and macroblocks dependent on each other by correlation coefficients, including: analyzing a flow of sequences; generating a first modified flow having a format of a nominal flow and having I images modified by substitution of selected correlation coefficients by coefficients of the same type, but being random, and a second flow of any format including the substituted correlation coefficients and digital information which can enable reconstruction of the modified images; transmitting the first and second modified flows from a server to destination equipment; and calculating on the destination equipment a synthesis of a flow of the nominal format as a function of the first and second flows.

27 Claims, 3 Drawing Sheets

FOREIGN PATENT DOCUMENTS

| | | |
|---|---|---|
| EP | 0 975 165 A2 | 1/2000 |
| EP | 1 011 269 A1 | 6/2000 |
| EP | 1 139 660 A1 | 10/2001 |
| WO | WO 99/08428 | 2/1999 |
| WO | WO 00/49483 | 8/2000 |
| WO | WO 00/60846 A2 | 10/2000 |
| WO | WO 01/65762 | 9/2001 |
| WO | WO 01/67667 A1 | 9/2001 |

\* cited by examiner

SECURED DEVICE FOR THE PROCESSING OF HIGH-QUALITY AUDIOVISUAL WORKS

RELATED APPLICATION

This is a §371 of PCT/FR03/00123, with an international filing date of Jan. 15, 2003 (WO 03/065725, published Aug. 7, 2003), which is based on French Patent Application No. 02/01100, filed Jan. 30, 2002.

FIELD OF THE INVENTION

This invention pertains to the secured processing, broadcasting, recording and visualization of video data and television programs or, more generally, any multimedia program or sequence using a MPEG type nominal flow format, by authorized users and provides a secured system for processing, broadcasting, delivering, recording, private copying and visualizing video or interactive multimedia programs and sequences.

BACKGROUND

The general problem is to provide a device capable of transmitting in a secured manner a set of high visual quality films in an MPEG type format (MPEG-1, MPEG-2) directly to a television screen and/or to be recorded on the hard disk of a box connecting the remote transmission network to the television screen, while preserving the audiovisual quality, but preventing fraudulent use such as the possibility of making pirate copies of films or audiovisual programs recorded on the hard disk of the decoder box.

With the presently available solutions, it is possible to transmit films and audiovisual programs in digital form via broadcast networks of the airwaves, cable, satellite, etc. type or via DSL (Digital Subscriber Line) type telecommunication networks or LRL (local radio loop) network or via DAB (Digital Audio Broadcasting) networks. Moreover, in order to prevent pirating of works broadcast in this manner, these works are often encrypted by various means well known to the expert in the field.

However, the principal disadvantage of all of the presently available solutions (TiVo Inc., WO 00/165762) is that it is necessary to transmit not only the encrypted data to the users but also the decryption keys. Transmission of the decryption keys can be performed prior to, at the same time as or after transmission of the audiovisual programs. In order to increase the security and thus the protection of the audiovisual works against ill-intentioned use, the decryption keys as well as the decryption functions of the audiovisual decoders can comprise enhanced security means such as smart cards or other physical keys that can optionally be updated remotely.

Thus, the presently available solutions applied to a decoder box with the ability of local recording of audiovisual programs in digital form on a support of any type such as a hard disk or other type of memory provides an ill-intentioned user the possibility of making unauthorized copies of the programs recorded in this manner because at any given moment the user has with a digital decoder box associated or not with smart card systems all of the information, software programs and data enabling the complete decryption of the audiovisual programs. Precisely because of the fact that the user possesses all of the data, the ill-intentioned user would have the possibility of making illegal copies without anybody becoming aware of this fraudulent copying when it is performed.

One solution would therefore consist of transmitting all or part of a digital audiovisual program solely on demand (on demand video services) via a broad-band telecommunication network of the DSL, cable or satellite type without authorizing the local recording of the audiovisual programs. The disadvantage is completely different and stems from the performances of these networks which do not make it possible to guarantee continuous flows of several megabits per second to each user as required by MPEG flows which require pass bands from several hundreds of kilobits to many megabits per second.

Under these conditions, one solution consists of separating the flow into two parts neither of which could be used by itself. For example, WO 09/908428 discloses a method for the multiapplication processing of a localizable active terminal in which there is implemented at least one link with an identifiable program dedicated to the execution of an application, said program dictating its conditions of exploitation to the terminal for the setting up of its functions. The terminal dialogues in a punctiform manner by using a link with the management center for the implementation, if necessary, of the inputs and outputs of the capacities of this center with the management center optionally becoming the slave of the terminal at the application level in relation to the incoming program. WO '428 also pertains to method for the identification of the program and the terminal in exploitation mode. That method divides the flow into a part used for identifying the user and a part that contains the actual program itself. In particular, said program is not unusable but merely made inaccessible by the first part.

In addition, EP 0778513 describes a method enabling prevention of illegal use of an information unit by adding to it a control information unit to verify the rights of the user. The system makes it possible to remain permanently informed as to which part of the information unit is used and by which user and thereby to be informed as to whether or not this user is in an illegal position. This method thus makes the data secure by adding additional information units which distort the initial information.

WO 00/49483 also discloses methods and systems for creating a link between the users and an editor of digitized entities. The method comprises at least one of the following steps: subdividing the digitized entity into two parts; storing one part in memory in a server connected to a computer-based network; transmitting the other part to at least one user who has available computer-based equipment; connecting the computer-based equipment to the computer-based network; establishing a functional link between the first part and the second part. These methods and systems do not specify whether the part stored in memory on the server can be stored by the user, which would enable the user to pirate the digitized entity.

U.S. Pat. No. 5,937,164 discloses a solution comprised of separating the flow into two parts, the smaller one of which holds an information unit required for the use of the larger part. This patent nevertheless is not sufficient for resolving the identified problem. In fact, suppression of a part of the flow distorts the format of the flow which then cannot be recognized as a standard flow that can be exploited with general software applications. This method of the prior art requires both a specific software program at the server side for the separation of the two parts, and another specific software program enabling not only the reconstruction of the flow, but also the acquisition of the principal flow and its exploitation according to a format proprietary to the solution. This proprietary format is not the initial format of the flow prior to separation into two parts in this known solution.

U.S. Pat. No. 5,892,825 returns to the approach of the preceding patents but in a narrower framework because the flows are still encrypted. U.S. Pat. No. 6,035,329 is based on the same principle and pertains to a method enabling the reading of a DC-ROM or DVD-ROM disk contingent on the identification of the rights by the insertion of a smart card on which the information required for reading are stored. That method is still not adequate because it does not ensure that the modified flow is of the same format as the original flow. U.S. Pat. No. 6,185,306 pertains to a method for the transmission of encrypted data from a Web site to a requesting computer. That method, however, makes it possible for the user to have available at a given moment the tools required for copying the data.

EP 1 011 269 discloses a system for processing an information signal. The object is to prevent the illicit distribution of compressed copies of information flow, especially audio, video and image. The conventional information flow protection systems are generally based on an encryption or scrambling performed on an already compressed and formatted copy of the flow (e.g., encryption of an already compressed DVD, etc.). Thus, the decrypted content of the flow for these conventional protection systems is in decompressed form and thus can be directly exploited and distributed. That system commences by encrypting or scrambling the flow, then compressing it (rather than first compressing then scrambling). In order to achieve this, that system comprises an analysis of the entropy of the flow which makes it possible to scramble the uncompressed flow while still preserving its entropy. Preserving its entropy makes it possible to attain the same compression efficacy for the flow. Scrambling consists of adding noise (of the pseudorandom white noise type) to the signal. This noise is generated by means of a scrambling key. This key is then encrypted by a single user via a public key-private key system, the private key employed being specific to the unscrambling system of the intended client. The scrambling key encrypted in this manner is then sent to the client possessing viewing rights at the same time as the protected flow. At the client end, the flow is decompressed, then an unscrambling signal is added to it (substrate) which is obtained by means of the unscrambling key provided to the client. In the case of video, that system applies to the DCT coefficients of each image prior to their compression (by VLC, etc.). Only the I images are scrambled because otherwise the other images of the MPEG flow would correct the following images, then it would be necessary to scramble all of the images. In the case of a DVD, for example, at the location, the point of sale gives to the client a diskette (or other medium) containing the unscrambling key corresponding to the client.

EP 0 975 165 discloses a device and a method for transmitting from a transmitter to a receiver signals the access to which is controlled. EP '165 pertains to the management of the copying and viewing rights of a video flow. It enables the transmission by two separate paths of two flows containing the video and the access control information. The video flow received in the client's device is, in a first implementation, unscrambled then optionally encrypted by a system based on public and private keys. If the user has all of the rights to the film, the user can freely copy it and watch it as desired. If the user only has the rights to one or a limited number of viewings, the flow copied on the client's equipment on a cassette or a CD or other medium will have been encrypted in advance. When the flow in question is viewed, it is decrypted by a decrypter contained in the client's equipment. If the user no longer has rights, the encrypted flow that was copied or is in the process of being read is not decrypted because the access control module does not authorize the decryption. The client access controls are managed and processed by an access control module that is internal in the client's equipment. The access control data are saved on the cassette or CD/DVD on which the video is recorded. They moreover can be downloaded. In another implementation, the same method is used but the access control module does not control an encrypter/decrypter pair integrated in the client's equipment but the unscrambler which unscrambles the video flow received by the video server.

WO 00/60846 discloses an on-demand video distribution solution via a system of distributed servers. Protection of the content of the digital video is based on public/private keys. The principal innovation of WO '846 is to enable a simplified encryption and decryption of the MPEG-TS flows. The calculation time is in fact greatly diminished thanks to an analysis of the MPEG-TS flow which makes it possible to not encrypt certain parts of the content. This flow analysis consists principally of marking the TS packets containing an information unit that is essential for the correct decoding (in the MPEG sense) of the video such that in a second encrypting phase only the marked TS packet payloads are not encrypted. Thus the essential information is not available for decoding and the flow thus cannot be displayed while still preserving a reasonable calculation time for encryption. It is then necessary to transmit in the flow the information enabling the decrypter to know whether or not the payload of a packet is encrypted. This can be done in various ways such as, for example, adding an info before the synchronization byte or by modification of the scrambling control bit or of an info of the adaptation field. The packets generated in this manner do not conform perfectly to the standard.

SUMMARY OF THE INVENTION

This invention relates to a method for distributing video sequences according to a nominal flow format including a succession of frames, each including at least one I block corresponding to a complete digital I image, each I image being broken down into blocks and macroblocks dependent on each other by correlation coefficients, including: analyzing a flow of sequences; generating a first modified flow having a format of a nominal flow and having I images modified by substitution of selected correlation coefficients by coefficients of the same type, but being random, and a second flow of any format including the substituted correlation coefficients and digital information which can enable reconstruction of the modified images; transmitting the first and second modified flows from a server to destination equipment; and calculating on the destination equipment a synthesis of a flow of the nominal format as a function of the first and second flows.

This invention also relates to apparatus for distributing a video flow including at least one multimedia server containing original video sequences including a device for analysis of the video flow originating from the server for generating the first and second flows.

This invention further relates to apparatus for distributing a video flow including a standard flow decoder, at least one recording interface intended for storing the content of the first flow and at least one display interface, and a means for reconstituting the original flow from the first and second flows.

This invention still further relates to a system for transmitting a video flow including the apparatus for distributing a video flow, at least one equipment unit for exploitation of a video flow, and at least one communication network between the production equipment and the exploitation equipment unit(s).

BRIEF DESCRIPTION OF THE DRAWINGS

Better understanding of the invention will be obtained from the description below of a nonlimitative example of implementation with reference to the attached drawings in which.

DETAILED DESCRIPTION

Figure 1:
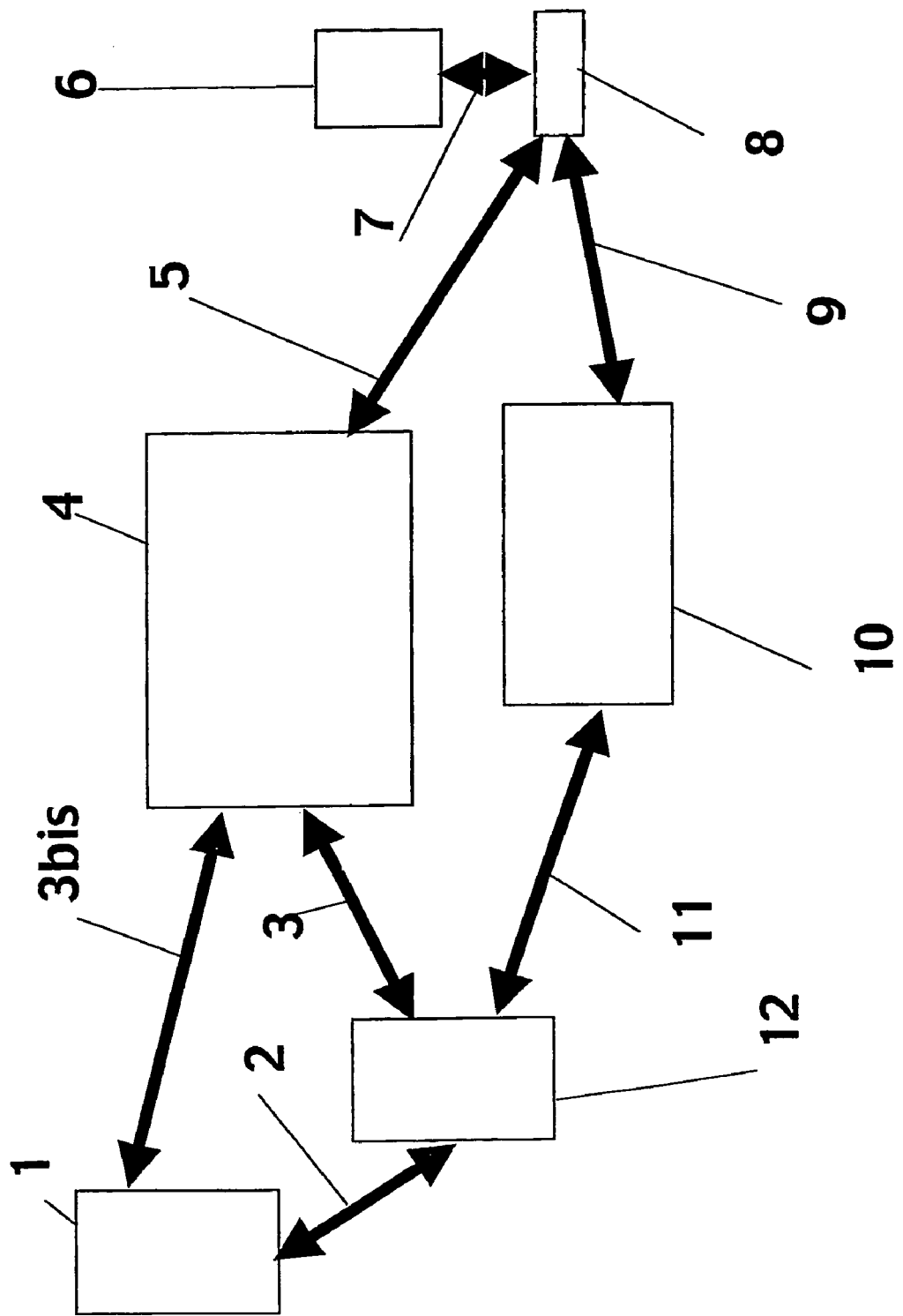
FIG. 1 is a schematic block diagram of the architecture of a system for the implementation of the method according to the invention.

This invention pertains in its broadest sense to a method for the distribution of video sequences according to a nominal flow format constituted of a succession of frames each comprising at least one I block corresponding to a complete digital I image, each I image being broken down into blocks and macroblocks dependent on each other by correlation coefficients, wherein there is performed prior to transmission to the client's equipment an analysis of the flow to generate a first modified flow having the format of a nominal flow and having I images modified by substitution of certain correlation coefficients by coefficients of the same type, but random, and a second flow of any format comprising the substituted correlation coefficients and digital information which can enable the reconstruction of said modified images, then of separately transmitting the two flows thereby generated from the server to the destination equipment, and there is calculated on the destination equipment a synthesis of a flow of the nominal format as a function of the first flow and the second flow.

The synthesis advantageously produces a flow rigorously identical to the original flow, i.e., the process is without loss.

According to one particular variant of this method, the nominal flow format is defined by the MPEG standards (MPEG-1, MPEG-2, etc.).

The analysis can advantageously determine the I images and the correlation coefficients to be modified to obtain the first flow. These modifications can be: replace the correlation coefficients of an I image with the correlation coefficients of another I image, invert two correlation coefficients of the same I image, invert two correlation coefficients of two I images of the same flow, replace the correlation coefficients of an I image with random values.

The video sequence according to a nominal flow format is advantageously constituted of a succession of frames each comprising at least one I block corresponding to a complete digital I image and at least one P block corresponding to the differences between a P image and at least one other I and/or P image. In this case, the analysis can determine the P images to be modified in addition to or in the place of the I images for obtaining the first flow. The modifications then brought to the P images are of the same type as those brought to the I images, i.e., modification of the correlation coefficients.

In one particular implementation of this method, transmission of the first flow is implemented by means of a physically distributed material support such as, e.g., a CD-ROM, a DVD, a hard disk or a flash memory card.

In another implementation of this method, transmission of the first flow is implemented via a broad-band network (cable, satellite, optical fiber, airwaves, DSL, DAB).

According to one implementation of this method, the transmission of the second flow is implemented via a cable network, via a switched telephonic network (analog or digital), via a mobile telephonic network using the GSM, GPRS or UMTS standards, via an LRL network (local radio loop) or via a DSL network.

According to one particular variant of this method, transmission of the second flow is implemented via a broad-band network of the same type as the network used for the first flow, i.e., via the same network. According to another variant of this method, transmission of the second flow is implemented by means of a flash memory card or by means of a smart card. Transmission of one or both of the two flows is advantageously encrypted.

One or both of the flows is advantageously watermarked by a conventional watermarking technique. Watermarking, also referred to as "digital watermarking," is a technique for marking digital visual or audio content, such as images, video flows or audio flows. The technique consists of a processing of the content in a manner such as to insert information units in the content. The inserted information units are generally invisible when viewing the contents but can be found by applying processes to the content. Two types of watermarking exist:

fragile watermark: the inserted information units are affected by a modification of the content; this type of watermark is used for detecting whether the content was modified;

robust watermark: the inserted information units are preserved even if the content was modified; this type of watermark is used, e.g., for associating author's rights with a work.

Depending on the implementation of this method, the two flows generated can be intended for a single equipment unit, a group of equipment units or all equipment units.

According to one particular mode of implementation, the reconstruction and thus the visualization is contingent on a transaction between the equipment unit and the portal such as payment, inscription in a subscription registry, etc.

Reconstruction can also be authorized by consultation of a private copy demanded by the client.

Generally speaking, the fact that the reconstruction is contingent on the authorization of the portal allows any operator of the service to manage all of the rights attached to the audiovisual works.

The invention moreover pertains to an equipment unit for the creation of a video flow for the implementation of this method comprising at least one multimedia server containing the original video sequences and comprises a device for the analysis of the video flow stemming from server to generate the two flows.

This equipment advantageously comprises a memory for recording a private copy marker indicating for each sequence the rights of each user: private copy that can be watched an unlimited number of times, private copy that can be watched a limited number of times and specification of that number, and private copying prohibited.

The invention moreover pertains to equipment for the exploitation of a video flow for the purpose of implementing this method comprising a standard flow decoder, at least one recording interface (hard disk, flash memory) intended to store the contents of the first flow and/or a disk reader (CD, DVD, etc.) and at least one display interface (standard screen, wireless screen, video projector), comprising a means for the recomposition of the original flow from the two flows.

According to one particular mode of implementation, the means is a software application installed in the equipment. According to another mode of implementation, the means is a fixed electronic device. According to another mode of implementation the means is a portable (mobile) electronic device with its integrated screen.

According to a mode of implementation in which the equipment is installed on a computer, the means uses a resource specific to the product (card) so as to prevent the copying of the temporary information of the second flow onto a permanent support.

The recording interface advantageously also stores a private copy marker in relation to the first flow indicating for this sequence the rights of the user: private copy that can be viewed an unlimited number of times, private copy that can be watched a limited number of times and specification of that number, private copying prohibited.

The equipment advantageously comprises a smart-card reader for identifying the user. The equipment also advantageously comprises a smart-card reader, the smart card containing the software applications. The equipment further advantageously comprises a smart-card reader, the smart card containing the data of the second flow for a given content.

The invention also pertains to a system for the transmission of a video flow comprising an equipment unit for production of a video flow, at least one equipment unit for exploitation of a video flow and at least one communication network between the production equipment and the exploitation equipment.

Reference will now be made to the drawings, wherein selected aspects of the invention are illustrated. The invention pertains to a flow of data of a nominal format especially, but not exclusively, a flow of the MPEG type (MPEG-1, MPEG-2). The format of the audiovisual flow used must have the following characteristics:
this format must break down the data into frames, each frame comprising a complete digital I image;
each I image breaks down into macroblocks of a given size, the macroblocks themselves breaking down into blocks of a given size;
each I image contains coefficients of correlation between the different blocks and/or macroblocks of the I images.

In the description below the example pertains to an MPEG-1 flow. This does not, however, constitute a limitation on the scope of protection.

The general principle of a method to ensure the security of a video flow is presented below. The objective is to authorize demand video and card-authorized video services via all of these broadcasting networks and the local recording in the user's digital decoder box. The solution consists of permanently preserving outside of the user's habitation, based on the broadcasting and transmission network, a part of the recorded audiovisual program, this part being essential for visualizing the audiovisual program on a television or monitor screen, but being of very small volume in relation to the total volume of the digital audiovisual program recorded by the user. The missing part will be transmitted via the broadcasting and transmission network at the time of visualization of the digital audiovisual program prerecorded by the user.

The greatest part of the audiovisual flow will thus be transmitted via a conventional broadcast network while the missing part will be sent on demand via a narrow-band telecommunication network such as conventional telephone networks or cellular networks of the GSM, GPRS or UMTS type, or using a small part of a DSL or LRL type network, or using a subset of the shared pass band on a cable network.

In FIG. 1, the video interface (8) setup is adapted for connecting at least one display device, e.g., a monitor, a video projector or a television screen type device (6) to at least one broad-band transmission broadcast network (4) interface and to at least one telecommunication network (10) interface. This setup is composed of a module (8) comprising principally a suitable processing unit for processing, in particular decoding and unscrambling, all MPEG type video flows according to a preloaded decoding and unscrambling software program in real or delayed time, of storing it, recording it and/or transmitting it on a telecommunications network, as well as a screen interface (7) and an interface for connection to a local or extended area network (5) and/or (9). The broad-band transmission and broadcasting network (4) and the telecommunication network (10) can be merged into a single network.

The hard disk of the module (8) can be used as a buffer memory for momentarily storing at least a part of the video program or sequence to be displayed in the case of delayed display or of limitation in the pass band of the transmission network. Visualization can be delayed or differed upon request of the user or the portal (12).

As shown in FIG. 1, the connection interface (5) is linked to a broad-band transmission and broadcasting network (4) such as a modem, a satellite modem, a cable modem, an optical fiber line or a radio or infrared interface for wireless communication.

It is by means of this conventional video broadcasting link that the contents of audiovisual programs such as films will be transmitted. Nevertheless, in order to prevent the possibility of pirate copies, prior to transmitting the audiovisual content from the server (1) or portal (12) it is provided to hold back a small part of the audiovisual content in the portal (12).

In the case of visualization of an audiovisual program in real time, this small part of the audiovisual content preserved in the portal (12) will also be sent to the module (8) via the telecommunication network (10).

Since the successive images of a video sequence contain a large number of identical visual elements (as with cinema, an image resembles the preceding image), MPEG only records the elements that differ from the original image. Thus an entire reference image is modified while preserving the DC coefficients of the implemented modifications in the portal (12) and, for the successive images dependent on this reference I image, it is not necessary to implement the modifications because they will diverge from the visualized flow because of the disturbances implemented in the reference I images. Thus, the MPEG compression commences initially by breaking down the image into different square matrices comprising multiple points or pixels, each having its own calorimetric value. A calculation makes it possible to obtain an average value for each matrix within which each point is maintained in embedded form. This process generates a pixellation and the appearance of uniform tints where tint nuances previously existed. The second step of the MPEG compression consists of preserving from one image to another only the changing elements.

In order to obtain MPEG-1 or MPEG-2 animated images, the principle consists of capturing several images in time, while the intermediary images are calculated from these images. Analysis of the complete reference images (referred to as I images=Intra-frame images) enables prediction of the intermediary P images (Predicted frames). Then, the B images (Bidirectional frames) are intercalated between the reference images and the predicted images.

The video is represented as a succession of individual images each of which is processed as a bidirectional matrix of image elements (pixels). The representation of the colors of each pixel comprises three components: a luminance component Y and two chrominance components Cb and Cr.

Compression of the digitized video is performed using multiple techniques: subsampling of chrominance information in order to adapt to the sensitivity of the human visual system (HVS), quantification, movement compensation (MC) to exploit the temporary redundancy, transformation in the frequency domain by discrete cosine transformation (DCT) to exploit the spatial redundancy, variable length coding (VLC) and image interpolation.

Since the human visual system (HVS) is most sensitive to the resolution of the luminance component of an image, the Y pixel values are coded at full resolution. The human visual system is less sensitive to chrominance information. Subsampling eliminates the values of pixels based systematically on position which reduces the amount of information to be compressed by other techniques. The standard preserves a set of chrominance pixels for each 2×2 neighborhood of luminance pixels.

The base coding unit of an image is the macroblock. The macroblocks of each image are coded successively from left to right and from top to bottom. Each macroblock is composed of six 8×8 blocks: four Y luminance blocks, one Cb chrominance block and one Cr chrominance block. It should be noted that the four luminance blocks cover the same zone of the image as each of the chrominance blocks due to the subsampling of the chrominance information performed to adapt the coding to the sensitivity of the human visual system.

For a given macroblock, the first operation is the selection of the coding mode which depends on the type of image, the efficacy of the movement compensated prediction in the coded region and the nature of the signal contained in the block. Secondly, a movement compensated prediction of the content of the block, based on the prior or future reference images, is formed. This prediction is subtracted from the real data of the current macroblock so as to form an error signal. Thirdly, this error signal is divided into six 8×8 blocks (4 luminance blocks and 2 chrominance blocks in each macroblock) to each of which is applied a discrete cosine transformation. The resultant 8×8 block of DCT coefficients is quantified. The resultant two-dimensional block is scanned in a zigzag manner in order to be converted into a unidimensional chain of quantified DCT coefficients. Fourthly, the annex information of the macroblock (type, vectors, etc.) as well as the data of the quantified coefficients are coded. In order to attain maximum efficacy, a certain number of variable length coding tables are defined by the different data elements. A range length coding is applied to the quantified coefficients data.

The DCT coefficient of the upper left point (0,0) of the block represents a zero horizontal and vertical frequency: it is referred to as the DC coefficient (continuous). Since the DC coefficient is proportional to the mean value of the pixels of the 8×8 block, the predictive coding makes possible a supplementary compression because the difference in the means values of the neighboring 8×8 blocks tends to be relatively small. The other coefficients represent one or more nonzero horizontal and/or vertical spatial frequencies and are called AC coefficients. In order for the quantification level of the coefficients corresponding to the high spatial frequencies to favor the creation of a zero coefficient, a quantification pitch is selected such that the human visual system (HVS) has a low likelihood of perceiving the loss of spatial frequency involved, unless the value of the coefficient is above this quantification level. The statistical coding of the predicted fields of coefficients of consecutive high order of zero value contributes considerably to the compression gain. In order to group together the nonzero coefficients at the beginning of the series and to code as many zero coefficients as possible following the last nonzero coefficient, their sequence is given by a zigzag scanning which concentrates the high spatial frequencies at the end of the series.

Variable length coding (VLC) is a statistical coding technique which assigns the code words to the values to be coded. Short code words are assigned to frequency values of high occurrence and long code words are assigned to those of low frequency. On average, the most frequent short code words are in the majority such that the coded chain is shorter than the original data.

The invention consists of using the correlation between the DC coefficients in an I image in order to be able to manipulate the appearance of visual validity of the sequence to which the I image in question belongs.

In fact, given that the I images are the principal carriers of information in a MPEG sequence, all important modifications affecting these I images will necessarily have an impact on the validity of the sequence.

Thus, the possibility of obtaining noteworthy degradations of the I images without performing complicated manipulations is offered by the correlation between the DC coefficients in this I image. Since these coefficients are strongly dependent on each other, they determine to a great extent the value of the coefficients of the same nature which follow. It is thus by modifying the information contained therein that one modifies profoundly the I images and consequently the entire MPEG sequence which follows this I image.

Each macroblock of an I image contains six blocks, each block commencing by a DC coefficient. Four blocks correspond to the luminance (Y) and two blocks correspond to the chrominance (C) of the macroblock. The value written in a file of the MPEG flow representing a DC coefficient is the difference between the real value of this coefficient and that of the corresponding preceding coefficient and which, for the Y blocks, can be located in the same macroblock or in the preceding macroblock, whereas for the C blocks it is always in the preceding macroblock. A modification of one of these differences results automatically in a modification of information in all of the following macroblocks.

This method is optimal for the visual degradation of the MPEG using the DC coefficients of the blocks, but it can also be applied to the AC coefficients. It can thus be envisaged to modify certain of these AC coefficients in a random manner, transmit by the second flow those coefficients that have been modified and that which is their real value and reconstitute the original flow by means of these information units. The subsequent flow is developed by using the DC coefficients, but it is agreed that all of the subsequent flow is applicable to the AC coefficients.

When it reads the binary train, a conventional MPEG decoder identifies the beginning of a coded image, then the type of image. In order to avoid any confusion between a standard decoder box (often referred to as a "Set Top Box" or STB), the standard MPEG decoder will be referred to as the "Reader" ("Player" or "Viewer") in the document below. This Reader can be implemented in hardware or software form. The MPEG reader decodes successively each macroblock of the image. The image is reconstructed when all of its macroblocks have been processed. In the case of an I image, it constitutes a reference image for the subsequent images and it is stored instead of the oldest reference image. The images are thus available in digital form for post-processing and display, according to the application.

In the case of an MPEG type audiovisual program, not all of the characteristics of the I images originating from the server (1) or the portal (12) are transmitted to the module (8). In particular, the characteristics according to the invention are the DC correlation coefficients contained in the I images.

Certain DC coefficients of these I images are preserved in the portal (12). In contrast, in place of the untransmitted DC coefficients of these I images, the device according to the invention intercalates false DC coefficients of the same type as the DC coefficients removed and preserved in the portal (12) such that the standard MPEG Reader of the module (8) is not disturbed by these modifications that it will be unaware of and reconstitute as output an outgoing MPEG flow that will be incorrect from the visual point of view for a human being but correct from the MPEG format point of view.

The MPEG Reader of the box (8) is a standard MPEG Reader and has not been changed in any way or affected by the changes performed on the I images.

As shown in FIG. 1, the connection interface (9) is linked to an extended telecommunication network (10) directly or via a local network serving as access network and it is constituted, e.g., by a subscriber line interface (analog or digital telephonic network, DSL, BLR, GSM, GPRS, UMTS, etc.).

Thus, the audiovisual programs are broadcast in a conventional manner in multidiffusion mode ("broadcast") via the broad band transmission network (4) of the airwaves, cable, satellite, digital airwaves, DSL type, etc., from the server (1) directly via the link (3 bis) or via the portal (12) via the link (2) and (3) to the decoder module (8) by means of the link (5). Each audiovisual program broadcast in this manner can be optionally encrypted and in accordance with the invention, the MIPEG flow contains modifications at the level of certain I images as described above. As a function of the parameters selected by the user or of the information transmitted by the broadcast server, certain audiovisual programs modified in this manner and incomplete are recorded on the hard disk of the box (8).

When the user wishes to display an audiovisual program recorded in this manner on the hard disk of box (8), a command is issued in the conventional manner via the remote control linked to box (8) which then connects automatically to the portal (12) via the link (9) of the local network or direct access type and via the telecommunication network (10) which is itself linked to the portal (12) via the link (11). During the entire display of the audiovisual program, the links (9) and (11) remain connected and allow the box (8) to receive the functions and parameters of restoring the order of the modified DC coefficients of the I images. The modified DC coefficients of the I images transmitted in this manner are never recorded on the hard drive of the box (8) because the reconstituted I images are directly displayed on the display screen (6) via the link (7) after having been processed by the Reader of the box (8) from its local volatile memory. Once they have been processed and displayed, the modified and/or missing DC coefficients of the I images having been transmitted by the portal (12) will be erased from the local volatile memory of the box (8).

According to a particular mode of implementation, the modified DC coefficients of the I images broadcast in this manner can be optionally encrypted by any existing or future encryption means. The same is true for the algorithms, functions and parameters of restoration of the modified DC coefficients of the I images.

Each time that the user wants to watch a program recorded on the hard disk of the box (8), the box (8) will connect automatically to the portal (12). The same is true when the user pauses, the transmission of the modified DC coefficients of the I images originating from the portal (12) will be interrupted until the restoration of the display, thus ensuring that not all of the information units of an audiovisual program will be found in the box (8) at a given moment and thereby preventing an ill-intentioned person from making pirate copies of these recordings.

According to a particular mode of implementation, the box (8) comprises a smart card reader which enables the portal (12) to authenticate the user owner of the box (8).

According to a particular mode of implementation, for a given MPEG content, the smart card contains said second flow which was stored in memory by the portal (12).

If this is authorized, the smart card also allows the user to make private copies of the audiovisual programs recorded on the hard disk of the decoder box (8). In order to do this, if the user wants to make a private copy of an audiovisual program, the user does so in the conventional manner on a VCR via the link (7) that connects the box (8) to the display screen (6).

However, if the user wishes to preserve a private copy on the hard disk of the box the user will so inform the box (8) which will record the "private copy" information as well as the coordinates of the user which are on the smart card in a particular field (84) of this audiovisual program recorded on the hard drive (85) of the decoder box (8). Whenever the user subsequently wants to watch this private copy, the box (8) will connect automatically to the portal (12) and inform the box that the user wants to implement a reading of the private copy. In response, if the reading of the private copy is possible for this user who possesses this smart card linked to this box (8), the decoder box (8) will then receive the modified and/or missing DC coefficients of the I images as well as all the other information enabling the display of the audiovisual program constituting the private copy.

According to another mode of implementation, if the user wants to preserve a private copy on the hard drive of the box (8), the user will so inform the server which will record in the private copy memory (124) of the portal (12) the "private copy" information unit for this program and for this user authenticated by the smart card. Each time that the user wants to watch this private copy, the box (8) will then connect automatically to the portal (12) and will inform this portal that the user wants to implement a reading of the private copy. In response, if the reading of the private copy is possible for this user who possesses this smart card and for this program, the decoder box (8) will then receive the missing DC coefficients of the I images as well as all other information enabling the display of the audiovisual program constituting the private copy.

According to a particular mode of implementation, the so-called "private copy" could enable the user to watch this same audiovisual program in an unlimited manner or a number of times determined in advance by the service provider who authorized this private copy.

The invention also pertains to the physical box (8) used by the consumer to access the data. This physical box is located at the user's domicile. It provides a set of functionalities which manage the appropriate information to be presented according to the audience's selection and manages the connection and communication with the remote server.

According to a particular mode of implementation, the physical box corresponding to the video interface setup (8) is implemented as a fixed autonomous device with integrated hard disk.

According to a particular mode of implementation, the physical box corresponding to the video interface setup (8) is implemented as a portable (mobile) autonomous device with integrated hard disk and/or disk reader (CD, DVD, etc.).

According to a particular mode of implementation, the autonomous physical box (8) comprises a smart card reader.

According to another particular implementation, the video interface setup (8) is implemented as an add-on card which can be installed in a PC-type computer and can be linked to at least one broad-band transmission and broadcasting network interface (4) and to at least one telecommunication network interface (10). This card can use the hard disk of the PC for recording the first flow, but can have its own calculator and its own volatile memory such as to not allow the ill-intentioned user of the PC the means to access the complementary information units such as the modified DC coefficients of the I images of the second flow.

The video and multimedia servers (1) and/or (12) comprise the means for coding, transcoding and scrambling of video data, in particular the means for adding cryptographic and security information units and the beginning and all along the sequences.

It finally should be noted that the invention degrades the MPEG flow from the visual point of view until no longer allowing recognition of the transmitted and displayed scenes without having access to the complementary data and characteristics, but completely reconstitutes the MPEG flow in the video interface setup (8) without any loss.

Figure 2:
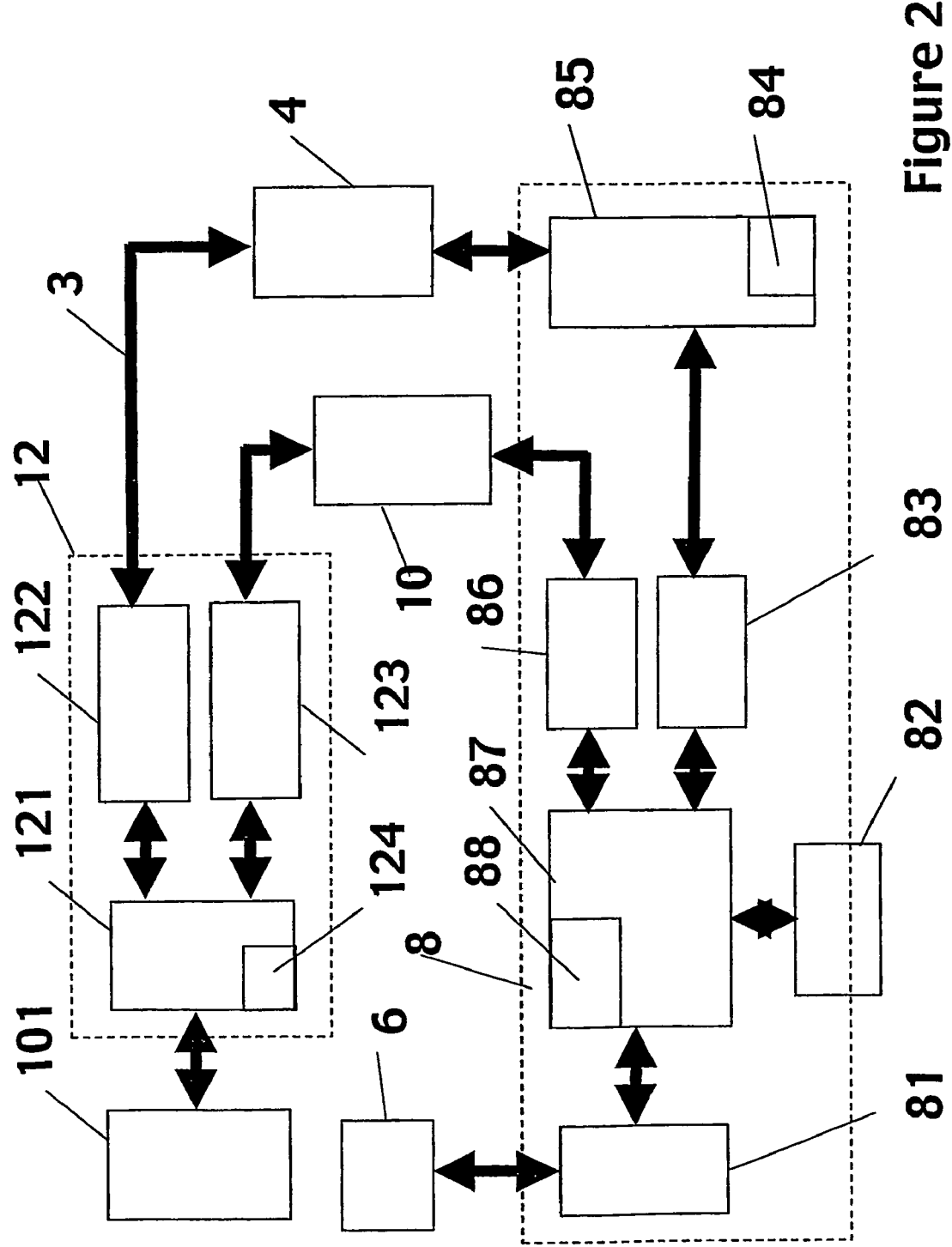
FIG. 2 is a schematic block diagram of one mode of implementation of the system for the analysis and synthesis of flow of the MPEG type in accordance with the invention.

Although the invention has focused most particularly on audiovisual data, it is understood that all interactive multimedia information and all interactive data can be processed by this setup and this system, MPEG type video data being the most elaborated. Better understanding of the invention will be obtained from the description below presenting the physical basis of the invention and with reference to FIG. 2 of the attached drawings representing a preferred mode of implementation of this latter setup as a nonlimitative example of implementation particularly suitable for cable and satellite networks. The complete MPEG flow (101) is analyzed by the analysis device (121) of the portal (120) and will thus be separated into an MPEG type flow whose missing DC coefficients of the I images will have been processed and sent via the output (122) of the portal to the broad band transmission broadcasting network (40).

The other part of the modified MPEG flow can be stored in memory in the buffer memory (123) of the portal (120). For each MPEG flow broadcast in this manner, the portal (120) can store in a buffer memory (123) the modifications that were implemented in this MPEG flow by the analyzer (121) of the portal (120). It should be clarified that for the same incoming MPEG flow (101) the processing of the flow can be different for each user (80) and/or for each group of users (80). Thus, the buffer (123) of the portal (120) comprises a different memory zone for each user.

In the implemented examples, for a first user all of the I images of the MPEG flow are modified; for a second user certain I images and certain P images of the MPEG flow are modified; in the third example the device (80) is portable (mobile).

We will now describe in detail the different steps for this first user.

The portal (121) selected the MPEG flow (101) that it must transmit to the user (80) to be watched on a delayed basis on his television screen (60). This user is linked to a digital cable broadcast network (40) and to an ADSL telecommunication network (100).

The analysis system (121) of the portal (12Q) will thus read the incoming MPEG flow (101) and each time that it detects an I image, it breaks it down into macroblocks (thus into slices), then into blocks. This analysis allows it to recognize in the code the DC coefficients and to replace certain among them by random values so as to make the images (and consequently the sequence) unreadable from the human vision point of view. The real values of the DC coefficients will be stored in the output buffer (123) which will later enable the reconstitution of the original sequence in the user (80), by following the reverse schema. In the implemented example, one out of every two macroblocks comprises a modified (DC coefficient) block while respecting the equality of the modification frequencies for the six blocks of a macroblock.

The analysis system (121) then writes the value of the substituted coefficient of the modified I image in the buffer (123). The analysis system (121) continues its analysis until the end of the incoming MPEG flow.

The new modified MPEG flow is then recorded in the output buffer (122) to be broadcast on the broadcast network (40) via the link (30). The substituted DC coefficients of the modified I images of the incoming MPEG flow (101) are stored in memory in the buffer (123) of the portal (120).

During this time and in a completely unsynchronized manner, the outgoing modified MPEG flow originating from the output buffer (122) of the portal (12Q) is broadcast via the broad band network (40) to one or more users (80).

Each authorized user (8) that wishes to record this MPEG flow modified in this manner can then read this MPEG flow and record it on its hard disk (85). This recording initiative is left to the user (8) under the control of the portal (120). In order to perform this, the analysis system (121) had written at the beginning of the MPEG flow an information unit of supplementary data that specified the addresses of this modified MPEG flow. The addressees can thus be a particular and single user (80), a group of addressees (80) or the totality of the user (80) linked to the network (40).

The phase described above corresponds to the first phase of preparation of the MPEG flow by the portal (120), its transmission via the broad band network (40) and its recording in at a user (8). This decoder can then display this MPEG flow recorded on its hard disk (85). In order to perform this, the synthesis system (87) of the user (80) will read the MPEG file from its hard disk (85) and will send it to a conventional MPEG reader (81). If no complementary data is received by the synthesis system (87), then the MPEG flow which reaches the reader (81) is processed and displayed as it is, which causes a huge distortion of the display on the visualization screen (60). In effect, the modified I images which are processed by the synthesis system (87) do not correspond to the I images which are required for a correct visualization because certain DC correlation coefficients were replaced by random coefficients. In contrast, since the recorded flow is definitely an MPEG type flow, the reader (81) does not discriminate and displays the information on the output screen (60) where it gives the appearance of an MPEG video flow but which is totally incoherent for the human being who watches the screen (60). Any copy of the MPEG flow originating from the hard disk (85) of the user (80) would produce the same visual effect when it is reconstituted by any MPEG reader; all uses of this copy which would be ill-intentioned are thus doomed to failure.

When the user (8) wants to correctly display on a screen the audiovisual program recorded on the hard disk (85), the user sends a request to the synthesis system (87) with a remote controller as with a VCR or DVD reader having a menu on a television screen. The synthesis system (87) then issues a request to the hard disk (85) and commences to analyze the modified MPEG flow originating from the hard disk (85) via the reading buffer (83). The synthesis system (87) then establishes a link with the portal (120) via the telecommunication network (100) which in the example is a DSL connection. Once this link has been established, and during the entire duration of visualization of the film or audiovisual program, the synthesis system (87) draws out from the buffer memory (123) of the server (120) the substituted correlation coefficients and the data corresponding to the modified I images of the flow recorded on the hard drive (85). These correlation coefficients and these position data are drawn out from the synthesis system (87) via the input buffer memory (86) and are stored temporarily in the volatile memory (88) of the synthesis system (87). From the modified MPEG flow that is drawn out via the buffer (83) and from the correlation coefficients and the associated data that are drawn out via the buffer (86) in the memory (88), the synthesis system reconstitutes, in reverse manner of the previously described analysis process, the I images modified by the real I images and sends the thereby reconstituted new MPEG flow to the reader (81) to be displayed correctly on the screen (60). Upon their use, the correlation coefficients to be substituted and the data associated with these I images are erased from the volatile memory (88).

In the implemented example, before the portal (120) authorized the transmission of the I images and the associated data from its buffer (123), the portal (120) had verified that the user (80) was in fact authorized to receive them. In order to implement this step, the portal (120) reads the information contained on the smart card (82) of the user (80) and verifies that the user is in fact authorized to watch this audiovisual program. It is not until this verification has been performed that the correlation coefficients and the associated data are sent from the buffer (123) to the user (80) via the network (100).

In the implemented example, the user had in addition made a private copy of the audiovisual program. The synthesis system (87) therefore recorded complementary data on a part (84) of the hard disk (85) as well as the number of the smart card (82) and the information unit "private copy" as data associated with this audiovisual program. Upon the next private reading of this audiovisual program, the synthesis system (87) will analyze these associated data and then inform the portal (12) that the user (80) is implementing a reading of the private copy. If this function is authorized for this user (80) by the portal (120), the correlation coefficients and the associated data will then be sent by the portal (120) to the buffer (86) as described above. In the contrary case, the correlation coefficients and the associated data will not be sent and the user (80) will not be able to watch the reconstituted MPEF flow.

We will now describe in detail the different steps for the second user (80).

In this second case, the broadcast network (40) is a satellite network and the telecommunication network (100) is a narrow pass band cellular telephony system of the GSM type.

In a manner identical to the description above, the user of the decoder (80) will receive the MPEG flows and the complementary data from the portal (120).

In contrast, in the implemented example, instead of modifying each I image, the analysis system (121) only takes one I image out of n in which n is a random number comprised between 1 and 12, and takes into account the P images. Thus, prior to transmitting the MPEG flow from the output buffer (122), the analysis system (121) will read the incoming MPEG flow (101) and after drawing the random number n, the synthesis system modifies the correlation coefficients of the nth I image of the MPEG flow. After each I image modified in this manner, the analysis system (121) will perform a new drawing of a random number n. Each random number used in this manner is recorded in the buffer (123) of the portal (120). For the P images, the analysis system (121) takes into account one P image out of m in which m is a random number comprised between 1 and 5, in a frame for which the I image was not modified.

The analysis system (121) of the portal (120) reads the incoming MPEG flow (101) and each time that it detects an nth I image or an mth P image, it breaks it down into macroblocks (thus into slices), and then into blocks. This analysis enables it to recognize the DC coefficients in the code and to substitute certain of them with random values in order to render the images (and by consequence, the sequence) unreadable from the human vision point of view. The true values of the DC coefficients will be stored in the output buffer (123) which will subsequently allow the reconstitution of the original sequence by the user (80) by following the reverse schema.

Moreover, in this second implemented example, not all of the DC coefficients of each nth I image will be modified. Only one macroblock out of two contains a modified (DC coefficient) block, while respecting the equality of the frequencies of modification for the six blocks of a macroblock. Moreover, the substitution of each DC coefficient is performed by a DC coefficient calculated in a random manner, but its value is compared to the value of the DC coefficient to be substituted in a manner so as to verify its deviation. If this deviation is too small, another random number is calculated so as to increase the deviation between the coefficient to be substituted and the substitution coefficient.

The same is true for the P images.

For the reconstitution of the MPEG flow, the user (80) reads the buffers (86) and (87) and decodes the data elements of the binary train, in accordance with the defined syntax.

When it reads the binary train, the decoder identifies the beginning of a coded image, then the type of image. It decodes successively each image macroblock. The macroblock type and the movement vectors are used to construct a prediction of the current macroblock based on the prior and future reference images which were stored in the decoder. The data of the coefficients are decoded and dequantified. Each 8×8 block of coefficient data is transformed by an inverse DCT. The result is added to the prediction signal with a defined dynamic. Prior to sending the MPEG to the reader (81), the synthesis system (87) replaces the DC coefficients of the I and P images which were substituted by those of the flow originating from the buffer (86).

Upon reconstitution of the MPEG flow by the synthesis system (87) of the user (80), the reading of these random numbers and substituted correlation coefficients from the output buffer (123) of the portal (120) and the reading of the thus modified MPEG from the hard disk (85) of the user (80) enable the synthesis system (87) to reconstitute the I and P images and to send the entirety to the reader (81).

The image is reconstructed by the reader (81) when all of these macroblocks have been processed. Whether in the case of an I image or a P image, it constitutes a reference image for the subsequent images and it is stored in the place of the old reference image. Prior to their display, it can be necessary to reorder the images in order to return the coding order to the natural display order. After having been reordered, the images are available in digital form for post-processing and display according to the application.

In the example implemented for this user, it was found that the second flow required a pass band smaller than one per thousand of the pass band required for transmitting the high-quality MPEG flow, or three kilobits per second for the second flow compared to three megabits per second for the first MPEG flow.

Figure 3:
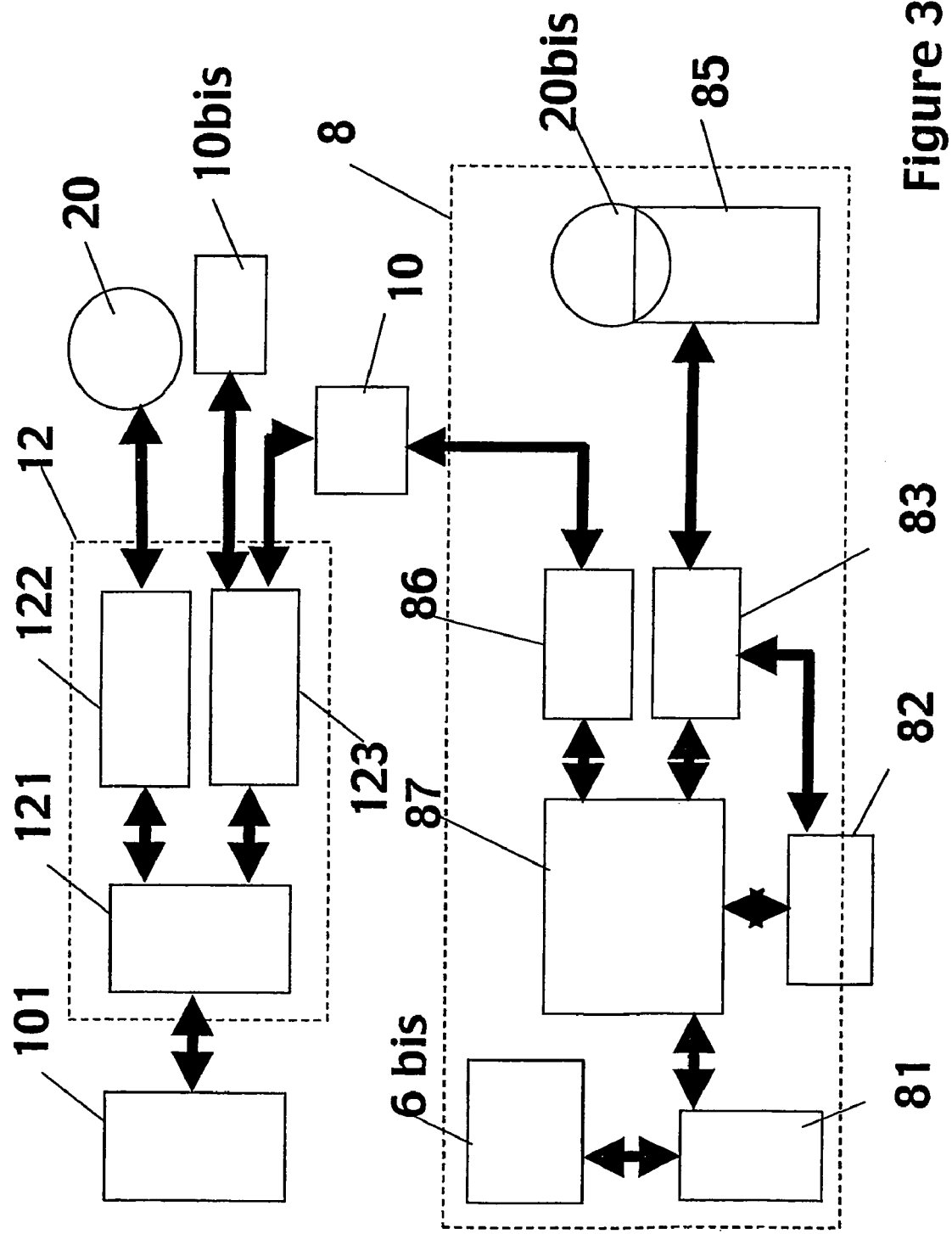
FIG. 3 is a schematic block diagram of another mode of implementation of the flow synthesis system according to the invention.

We will now describe in detail the different steps for the third implementation representation represented in FIG. 3.

In this implementation, the MPEG flow is processed by the analysis system (120) in the same manner as the MPEG flow of the second implementation. However, the first modified MPEG flow is read and recorded on a physical support (20) of the CD type from the output buffer of the analysis system (120).

The second flow is stored in memory in the buffer (123) and is also recorded additionally on a physical support (10 bis) of a credit card format constituted by a smart card and a flash memory. This card (10 bis) will be read by the card reader (82) of the user (80). The user (80) is an autonomous, portable and mobile system. In the implementation, the user (80) comprises the synthesis system (87), the standard MPEG reader (81), the two buffer memories (86) and (83) as well as the disk reader (85).

The user (80) moreover comprises an integrated screen (6 bis) of the flat screen type which allows the user to directly watch audiovisual programs on the autonomous user (80).

In order to watch an audiovisual program of the MPEG type, the user (8O) introduces into the disk reader (85) a disk (20 bis) of the type (20) identical to that recorded by the analysis system (120). This disk (20 bis) thus contains an MPEG flow of the first flow type, i.e., with the DC coefficients of certain substituted I and/or P images.

The user (80) can thus visualize this MPEG flow on screen (6 bis) integrated in the device. However, because of the substitution of the DC coefficients, the MPEG flow will not be valid from the visual point of view. In order to render the flow visually valid, the user introduces into the smart card reader (82) the memory card (10 bis) containing the second flow with the DC coefficients. The synthesis system then reconstitutes the correct MPEG flow from the first flow stemming from the disk (20 bis) and the second flow stemming from the card (10 bis) connected to the reader.

In a particular setup, the smart card (10 bis) also contains the applications and the algorithms which will be executed by the synthesis system (87).

In another particular setup, the smart card (10 bis) contains the data and the DC coefficients of multiple second flows for the reconstitution of multiple MPEG flows.

In a particular setup, the user (80) comprises a cellular link to a GSM network (100).

The invention claimed is:

1. A method for distributing video sequences according to a nominal flow format including a succession of frames, each comprising at least one I block corresponding to a complete digital I image, each I image being broken down into blocks and macroblocks dependent on each other by correlation coefficients, comprising:
   analyzing a flow of sequences;
   generating a first modified flow having a format of a nominal flow and having I images modified by substitution of selected correlation coefficients by coefficients of the same type, but being random, and a second flow of any format comprising the substituted correlation coefficients and digital information which can enable reconstruction of the modified images;
   transmitting the first and second modified flows from a server to destination equipment; and
   calculating on the destination equipment a synthesis of a flow of the nominal format as a function of the first and second flows.

2. The method according to claim 1, wherein each frame comprises at least one P block corresponding to differences between an image referred to as a P image and at least one other I and/or P image.

3. The method according to claim 2, wherein at least one P image is modified in the same manner as the I images.

4. The method according to claim 1, wherein the nominal flow format is defined by a MPEG-1 or MPEG-2standard.

5. The method according to claim 1, wherein the analysis can determine which I and/or P images to modify.

6. The method according to claim 1, wherein analysis can determine the correlation coefficients to modify.

7. The method according to claim 1, wherein transmission of the first flow is implemented via a physically distributed material support.

8. The method according to claim 1, wherein transmission of the first flow is implemented via a broad band network or DAB.

9. The method according to claim 1, wherein transmission of the second flow is implemented via a switched telephonic network or via a DSL type network or via a LRL network (local radio loop) or via a mobile telephonic network using GSM, GPRS or UMTS standards.

10. The method according to claim 1, wherein transmission of the second flow is performed via a physically distributed material support.

11. The method according to claim 1, wherein transmission of the second flow is implemented via a broad band network of the same type as the network used for the first flow.

12. The method according to claim 1, wherein transmission of the broad band flow is implemented via the same broad band network as the network used for the first flow.

13. The method according to claim 1, wherein transmission of at least one of the two flows is encrypted.

14. The method according to claim 1, wherein at least one of the two flows is watermarked.

15. The method according to claim 1, wherein the two generated flow are intended for a single equipment unit, a group of equipment units or all equipment units.

16. The method according to claim 1, wherein reconstruction is contingent on a transaction.

17. The method according to claim 1, wherein reconstruction can be authorized by consultation of a private copy requested by the client.

18. Apparatus for distributing a video flow according to the method of claim 1, comprising at least one multimedia server containing original video sequences including a device for analysis of the video flow originating from the server for generating the first and second flows.

19. The apparatus according to claim 18, further comprising a memory for recording a "private copy" marker indicating for each sequence rights of each user.

20. Apparatus for distributing a video flow according to the method of claim 1, comprising a standard flow decoder, at least one recording interface intended for storing the content of the first flow and at least one display interface, and a means for reconstituting the original flow from the first and second flows.

21. The apparatus according to claim 20, wherein the reconstituting means is a software program.

22. The apparatus according to claim 20, wherein the reconstituting means is a software program on a smart card.

23. The apparatus according to claim 20, wherein the reconstituting means is an electronic device.

24. The apparatus according to claim 20, wherein, in the case of installation on a computer, the reconstituting means uses a resource specific to the product to prevent copying of temporary information on a permanent support.

25. The apparatus according to claim 20, wherein the recording interface also stores a "private copy" marker in relation to the first flow indicating for the sequence rights of a user.

26. The apparatus according to claim 20, further comprising a smart card reader enabling identification of a client to display an audiovisual program recorded on the interface.

27. A system for transmitting a video flow comprising the apparatus according to claim 18, at least one equipment unit for exploitation of a video flow according to claim 20, and at least one communication network between the production equipment and the exploitation equipment unit(s).

* * * * *